United States Patent
Cohen et al.

(10) Patent No.: US 7,453,898 B1
(45) Date of Patent: Nov. 18, 2008

(54) METHODS AND APPARATUS FOR SIMULTANEOUSLY SCHEDULING MULTIPLE PRIORITIES OF PACKETS

(75) Inventors: Earl T. Cohen, Fremont, CA (US); Flavio Giovanni Bonomi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 944 days.

(21) Appl. No.: 10/339,032

(22) Filed: Jan. 9, 2003

Related U.S. Application Data

(63) Continuation-in-part of application No. 10/109,785, filed on Mar. 30, 2002, now Pat. No. 7,184,443.

(51) Int. Cl.
H04L 12/26 (2006.01)
H04L 12/56 (2006.01)
(52) U.S. Cl. ........................ 370/414; 370/418
(58) Field of Classification Search ............. None
See application file for complete search history.

(56) References Cited

U.S. PATENT DOCUMENTS

| | | | |
|---|---|---|---|
| 4,733,390 | A | 3/1988 | Shirakawa et al. |
| 5,500,858 | A | 3/1996 | McKeown |
| 5,923,644 | A | 7/1999 | McKeown et al. |
| 6,212,182 | B1 | 4/2001 | McKeown |
| 6,262,986 | B1 | 7/2001 | Oba et al. |
| 6,445,707 | B1 * | 9/2002 | Iuoras et al. ......... 370/395.43 |
| 6,628,646 | B1 * | 9/2003 | Angle et al. ............. 370/355 |
| 6,757,246 | B2 | 6/2004 | Alasti et al. |
| 6,904,047 | B2 * | 6/2005 | Han et al. ............... 370/414 |
| 7,058,751 | B2 * | 6/2006 | Kawarai et al. ......... 710/317 |

(Continued)

FOREIGN PATENT DOCUMENTS

EP 1052814 A 11/2000

(Continued)

OTHER PUBLICATIONS

Nick McKeown, *The iSlip Scheduling Algorithm for Input-Queued Switches*, IEEE/ACM Transactions on Networking, vol. 7, No. 2, Apr. 1999, pp. 188-201.

(Continued)

Primary Examiner—Chi H. Pham
Assistant Examiner—Soon D. Hyun
(74) Attorney, Agent, or Firm—The Law Office of Kirk D. Williams

(57) ABSTRACT

Methods and apparatus are disclosed for simultaneously scheduling multiple priorities of packets, such as in systems having a non-blocking switching fabric. In one implementation, the maximum bandwidth which a particular input can send is identified. During a scheduling cycle, a current bandwidth desired for a first priority of traffic is identified, which leaves the remaining bandwidth available for a second priority of traffic without affecting the bandwidth allocated to the first priority of traffic. By determining these bandwidth amounts at each iteration of a scheduling cycle, multiple priorities of traffic can be simultaneously scheduled. This approach may be used by a wide variety of scheduling approaches, such as, but not limited to using a SLIP algorithm or variant thereof. When used in conjunction with a SLIP algorithm, the current desired bandwidths typically correspond to high and low priority requests.

11 Claims, 11 Drawing Sheets

U.S. PATENT DOCUMENTS

| | | |
|---|---|---|
| 2001/0043606 A1 | 11/2001 | Han et al. |
| 2003/0072326 A1 | 4/2003 | Alasti et al. |
| 2003/0193941 A1 | 10/2003 | Bonomi et al. ............. 370/389 |
| 2004/0165598 A1 | 8/2004 | Shrimali et al. |
| 2004/0218600 A1 | 11/2004 | Alasti et al. |

FOREIGN PATENT DOCUMENTS

| | | |
|---|---|---|
| WO | WO 03/085909 | 10/2003 |

OTHER PUBLICATIONS

McKeown et al., *Tiny Tera: A Packet Switch Core*, IEEE Micro, vol. 17, Issue 1, Jan.-Feb. 1997, pp. 26-33.

Nick McKeown and Thomas E. Anderson *A Quantitative Comparison of Scheduling Algorithms for Input-Queued Switches*, Computer Networks and ISDN Systems, vol. 30, No. 24, pp. 2309-2326, Dec. 1998.

Pankaj Gupta and Nick McKeown, *Designing and Implementing a Fast Crossbar Scheduler*, IEEE Micro, vol. 19, Issue 1, Jan.-Feb. 1999, pp. 20-28.

U.S. Appl. No. 10/109,785, filed Mar. 30, 2002, Bonomi et al.

U.S. Appl. No. 10/684,282, filed Oct. 10, 2003, Patrick A. Costello.

Wenzhe Cui et al., "A threshold based scheduling algorithm for input queue switch," IEEE, 2001, pp. 207-212.

Chao H J et al., "Centralized contention resolution schemes for a large-capacity optical ATM switch," ATM Workshop Proceedings, 1998 IEEE, Fairfax, VA, USA pp. 11-16, May 26, 1998.

* cited by examiner

GENERATING REQUESTS

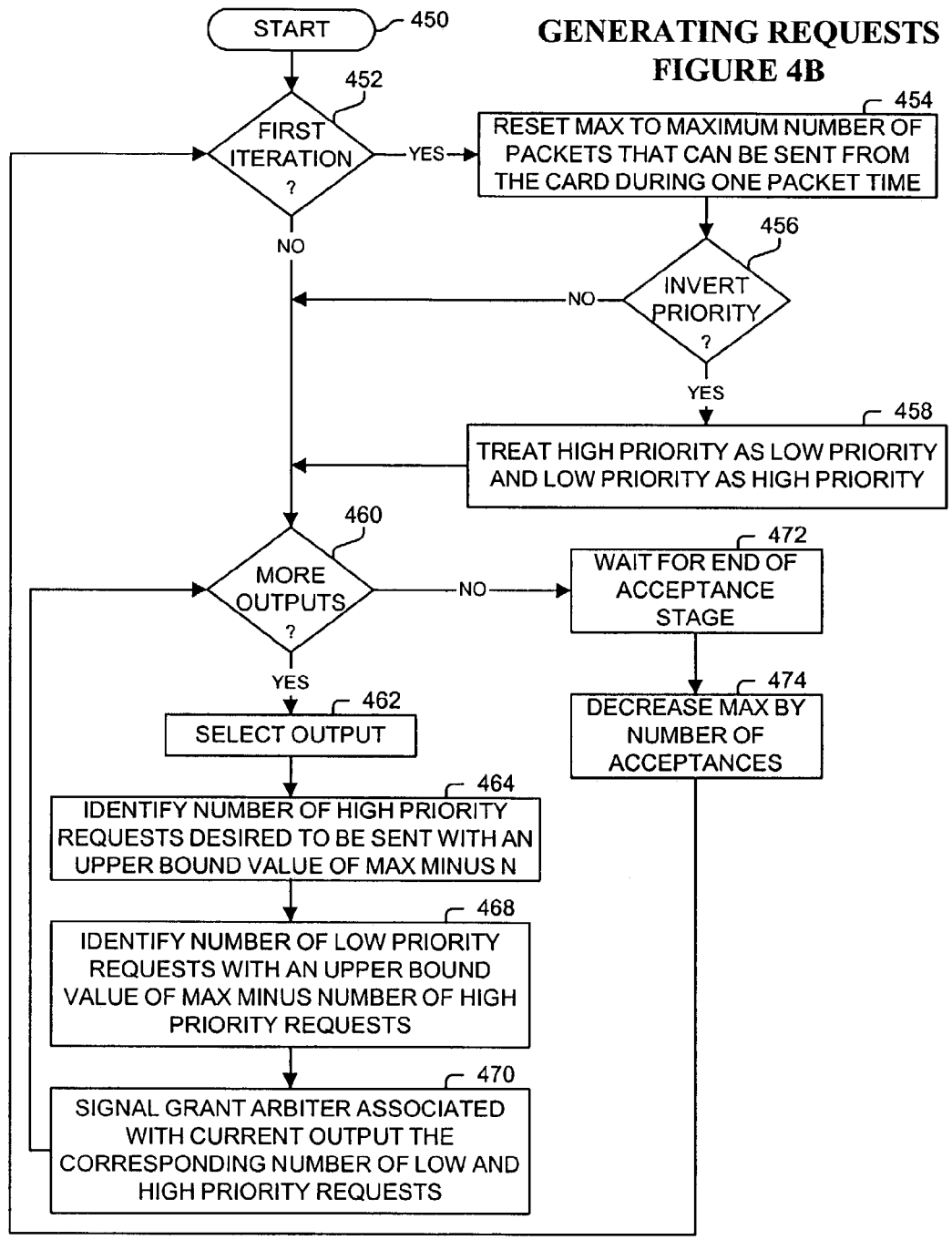

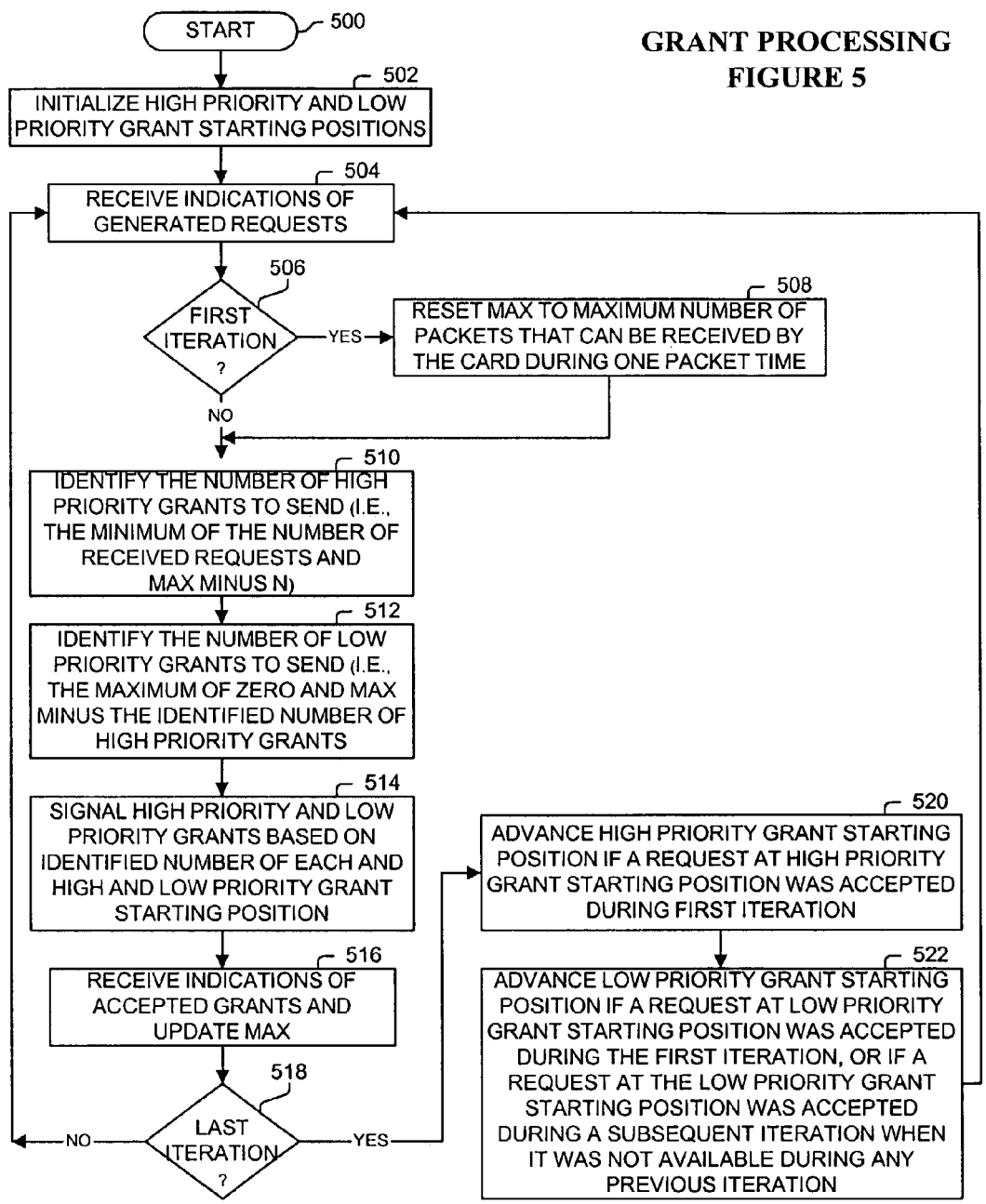

ACCEPTANCE
PROCESSING

METHODS AND APPARATUS FOR SIMULTANEOUSLY SCHEDULING MULTIPLE PRIORITIES OF PACKETS

CROSS-REFERENCE TO RELATED APPLICATIONS

This is a continuation-in-part of application Ser. No. 10/109,785, filed Mar. 30, 2002, now U.S. Pat. No. 7,184,443, and hereby incorporated by reference.

FIELD OF THE INVENTION

This invention especially relates to communications and computer systems; and more particularly, the invention relates to simultaneously scheduling multiple priorities of packets, which may be particularly applicable, but not limited to systems including a non-blocking switching fabric.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

SLIP is an iterative algorithm for scheduling the sending of packets across an N×N switch. In one implementation, the following three steps are performed:

1. Each unmatched input sends a request to every output for which it has a queued cell.
2. If an unmatched output receives any requests, it chooses the one that appears next in a fixed, round-robin schedule starting from the highest selection priority element. The output notifies each input whether or not its request was granted. The pointer to the highest selection priority element of the round-robin schedule is incremented (modulo N) to one location beyond the granted input if and only if the grant is accepted in step 3 of the first iteration. The pointer is not incremented in subsequent iterations.
3. If an input receives a grant, it accepts the one that appears next in a fixed, round-robin schedule starting from the highest selection priority element. The pointer to the highest selection priority element of the round-robin schedule is incremented (modulo N) to one location beyond the accepted output.

I-SLIP is a scheduling algorithm including multiple iterations of the SLIP algorithm to determine the scheduling of packets for each round of sending packets (rather than just one SLIP iteration.)

Each output scheduler decides among the set of ordered, competing requests using a rotating selection priority. When a requesting input is granted and the input accepts that grant, the input will have the lowest selection priority at that output in the next cell time. Also, whatever input has the highest selection priority at an output will continue to be granted during each successive time slot until it is serviced. This ensures that a connection will not be starved: the highest selection priority connection at an output will always be accepted by an input in no more than N cell times.

Moving the pointers not only prevents starvation, it tends to desynchronize the schedulers. Each of the outputs that matched in the previous time slot will have a different highest selection priority input. Thus, they will each grant to different inputs. Consider an example in which two inputs are both requesting the same two outputs. Initially, both outputs may grant to the same input; in that case only one connection will be made in the first iteration.

The successful output will increment its pointer and in the next cell time, the outputs will no longer contend: one will have moved on to grant to another input and the other will grant to the same input as before. This leads to a better match in the first iteration of the next cell time. This is because the output schedulers have become desynchronized (or "slipped") with respect to each other. This leads to high performance, even for a single iteration of SLIP.

Because of the round-robin movement of the pointers, the algorithm tends to provide a fair allocation of bandwidth among competing connections and to be burst-reducing. The burst-reduction is simplest to understand under high load when all input queues are occupied: the algorithm will visit each competing connection in turn, so that even if a burst of cells for the same output arrives at the input, the burst will be spread out in time if there is competing traffic.

An example implementation is described in Nicholas W. McKeown, "Method and Apparatus for Scheduling Cells in an Input-Queued Switch, U.S. Pat. No. 5,500,858, issued Mar. 19, 1996, which is hereby incorporated by reference. Another example implementation is described in Nicholas W. McKeown, "Combined Unicast and Multicast Scheduling," U.S. Pat. No. 6,212,182, issued Apr. 3, 2001, which is hereby incorporated by reference.

It is often desirable for quality of service and other purposes to have multiple priorities of traffic. Implementing priorities in a packet switching system, such as one with a crossbar switching fabric, is typically performed by first scheduling the higher priority traffic, then subsequently scheduling the lower priority for any bandwidth not allocated to the higher priority traffic. Thus, the time required to perform such scheduling typically requires a multiple (e.g., twice for two priority levels, three times for three priority levels, etc.) of the time required to perform scheduling of a single priority level. Needed are new methods and apparatus for efficiently performing scheduling of multiple priorities of traffic.

SUMMARY OF THE INVENTION

Methods and apparatus are disclosed for simultaneously scheduling multiple priorities of packets, such as, but not limited to using a SLIP algorithm or variant thereof. In one embodiment, a maximum number of requests that can be sent from a particular input is identified. A number of high priority requests corresponding to a first priority of packets is identified for each output, wherein the number of high priority requests is less than or equal to the maximum number. A total number of high priority requests is determined, wherein the number of total high priority requests is the lesser of the maximum number and the sum of the number of high priority requests for each of the outputs. For each particular output, a number of low priority requests corresponding to a second priority of packets desired to be sent from the particular input to the particular output is identified, wherein the number of low priority requests is less than or equal to the maximum number of requests minus the number of total high priority requests. Each grant arbiter is then signaled with a corresponding indication of the number of high priority requests and the number of low priority requests for said each particular output to which said the grant arbiter is associated.

In one embodiment, a maximum number of requests that can be sent from a particular input is identified. A number of high priority requests corresponding to a first priority of packets is identified for each output, wherein the number of high priority requests is less than or equal to the maximum number. A number of low priority requests corresponding to a second priority of packets desired to be sent from the particular input to the particular output is identified, wherein the number of low priority requests is less than or equal to the maximum number minus the number of high priority requests to the particular output. A grant arbiter associated with the particular output is provided with an indication of the number of high priority requests and the number of low priority requests.

In one embodiment, the maximum number of requests equals the maximum number of packets that can be sent from the particular input in a single packet time. In one embodiment, one or more indications of a number of acceptances of previously generated requests are received, wherein the maximum number of requests equals the maximum number of packets that can be sent from the particular input in a single packet time decreased by the number of acceptances of previously generated requests. In one embodiment, the first priority of packets is higher than the second priority of packets. In one embodiment, the second priority of packets is higher than the first priority of packets.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 4B is a flow diagram of a process used in one embodiment for generating requests;

FIG. 5 is a flow diagram of a process used in one embodiment in performing grant processing;

DETAILED DESCRIPTION

Figure 1A:
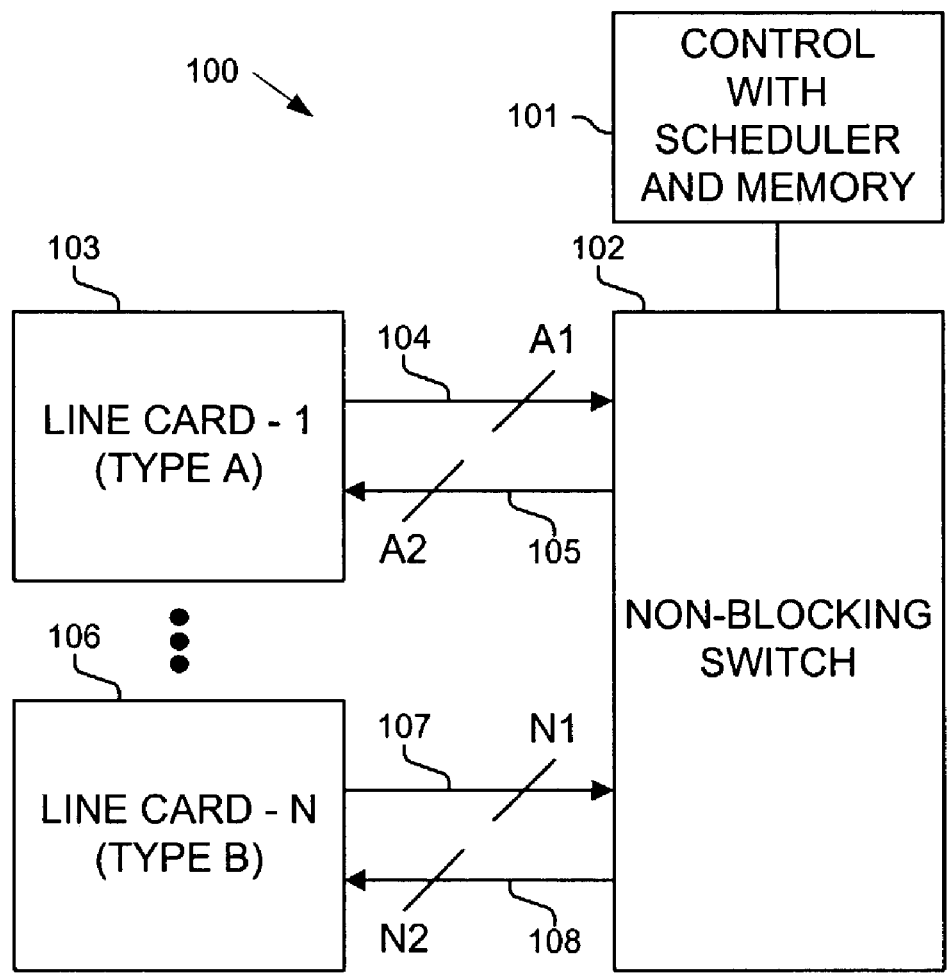
FIGS. 1A-E and 2 are block diagrams of embodiments simultaneously scheduling multiple priorities of packets.

Methods and apparatus are disclosed for simultaneously scheduling low, high and/or other priority levels of packets in systems. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet contents (e.g., packet header or other fields), and such steps or action may or may not include modifying and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for simultaneously scheduling multiple priorities of packets. In one embodiment, a maximum number of requests that can be sent from a particular input is identified. A number of high priority requests corresponding to a first priority of packets is identified for each output, wherein the number of high priority requests is less than or equal to the maximum number. A total number of high priority requests is determined, wherein the number of total high priority requests is the lesser of the maximum number and the sum of the number of high priority requests for each of the outputs. For each particular output, a number of low priority requests corresponding to a second priority of packets desired to be sent from the particular input to the particular output is identified, wherein the number of low priority requests is less than or equal to the maximum number of requests minus the number of total high priority requests. Each grant arbiter is then signaled with a corresponding indication of the number of high priority requests and the number of low priority requests for said each particular output to which said the grant arbiter is associated. In one embodiment, a maximum number of requests that can be sent from a particular input is identified. A number of high priority requests corresponding to a first priority of packets is identified for each output, wherein the number of high priority requests is less than or equal to the maximum number. A number of low priority requests corresponding to a second priority of packets desired to be sent from the particular input to the particular output is identified, wherein the number of low priority requests is less than or equal to the maximum number minus the number of high priority requests to the particular output. A grant arbiter associated with the particular output is provided with an indication of the number of high priority requests and the number of low priority requests.

In one embodiment, the maximum number of requests equals the maximum number of packets that can be sent from the particular input in a single packet time. In one embodiment, one or more indications of a number of acceptances of previously generated requests are received, wherein the maximum number of requests equals the maximum number of packets that can be sent from the particular input in a single packet time decreased by the number of acceptances of previously generated requests.

In one embodiment, the first priority of packets is higher than the second priority of packets. In one embodiment, the second priority of packets is higher than the first priority of packets. By normally considering the first priority higher than the second priority and occasionally performing a scheduling cycle with the second priority considered higher than the first priority, one embodiment provides guaranteed bandwidth for and prevents or decreases the potential starvation of packets corresponding to the second priority level.

In one embodiment, the maximum number of requests considered for high priority requests is the maximum number of packets that can be sent from the particular input in a single packet time minus some number N of packets, which allows the number of low priority requests to be increased by N packets (e.g., some bandwidth is guaranteed to be available for both high and low priority packets during a scheduling iteration or cycle.) In one embodiment, the value of N is always zero (and thus, the maximum number of requests considered for high priority requests is the maximum number of packets that can be sent from the particular input in a single packet time). In one embodiment, the value of N is set to zero during a scheduling iteration or cycle in which there are no low priority packets to be sent.

In one embodiment, a "packet time" is a time interval for a given switch configuration during which one or more packets can be sent from one or more inputs to one or more outputs. In one embodiment, the packet time corresponds to the scheduling time interval required or allocated to perform the scheduling of packets, and thus, packets can be sent while the packet scheduling and corresponding switch configuration are being determined for the next packet time.

Although the scheduling mechanisms may be described in terms of low and high priority packets, requests, grants, acceptances, etc., the methods and apparatus disclosed herein are also applicable to simultaneous scheduling of two or more identifiable categories or types of traffic, such as, but not limited to unicast and multicast traffic. Moreover, additional priority levels are supported by successively determining the corresponding number of requests, grants, or acceptances for each of the priority levels of the additional priority levels in the same manner as, and after determining the corresponding values for the high and low priorities. Additionally, one embodiment simultaneously schedules more than two priority levels of traffic wherein at least one priority level is higher than the first (or high) priority level described herein, and possibly with one or more additional priority levels higher and/or lower priorities than the high and low (or second) priority levels described herein.

FIG. 1 illustrates one embodiment of a system 100 including a non-blocking switch (or switch fabric) 102, a control with scheduler and memory 101, and multiple line cards 103-106. Line card 103 is denoted as being of "type A" with A1 ingress links or ports 104 and A2 egress links or ports 105. Line card 106 is denoted as being of "type B" with N1 ingress links or ports 107 and N2 egress links or ports 108. This labeling emphasizes that interfaces and line cards with varying rates and numbers of ports or connections to a non-blocking switch 102 are supported.

Figure 1B:
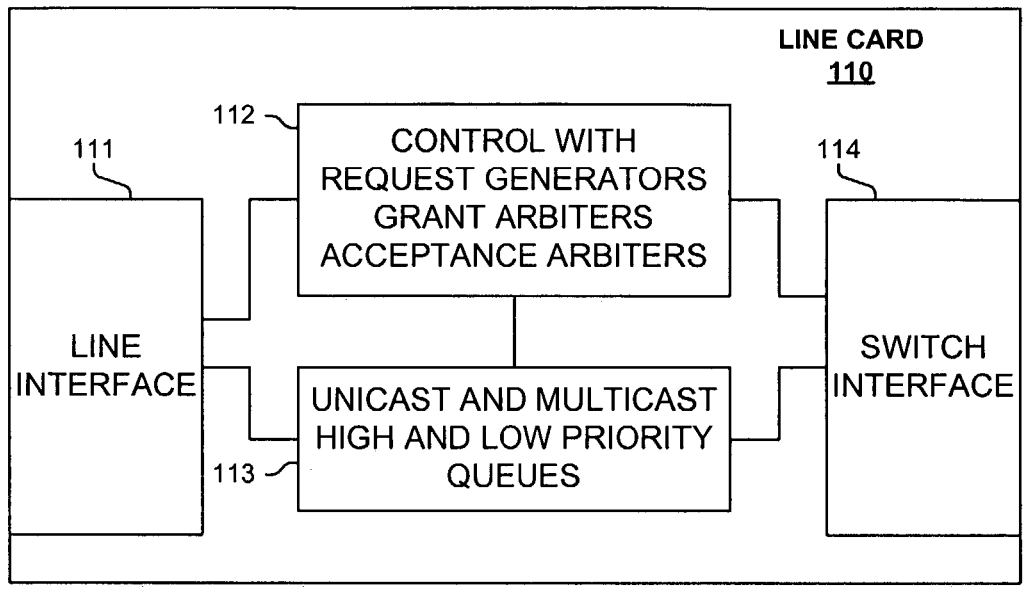

FIG. 1B illustrates one embodiment of a line card 110. Signals including packets or other data formats are received and transmitted by line interface 111. Shown are unicast and multicast high and low priority queues 113, wherein incoming packets to be scheduled are placed in one embodiment. Control with request generators, grant arbiters, and acceptance arbiters 112 determines and schedules packets as described hereinafter, with packets being sent from unicast and multicast high and low priority queues 113 at their respective scheduled times via switch interface 114. Additionally, scheduling requests, grants, and acceptances are communicated among other request generators, grant arbiters, and acceptance arbiters via switch interface 114.

Figure 1C:
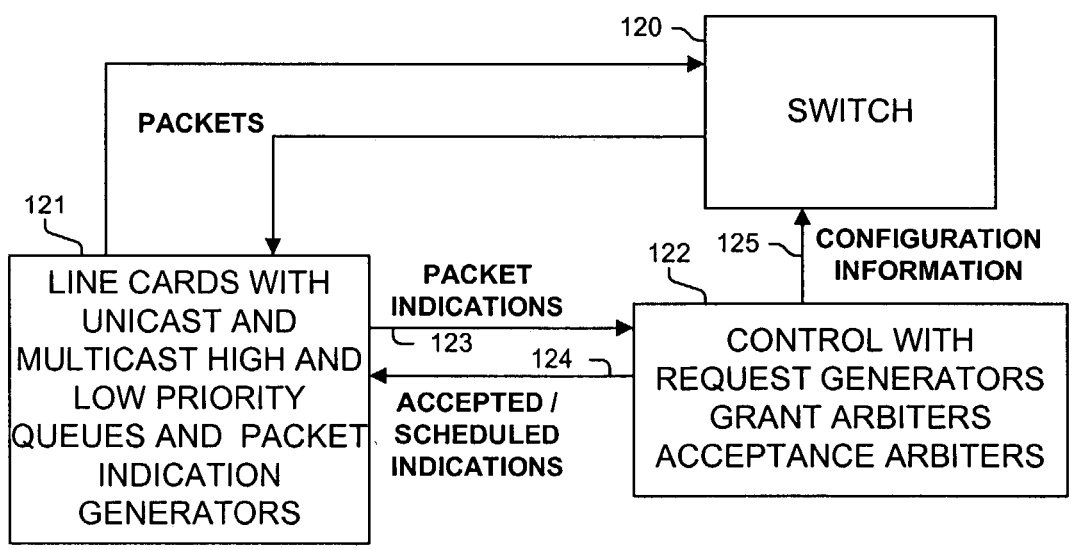

FIG. 1C illustrates one embodiment wherein the request generators, grant arbiters, and acceptance arbiters are centrally located in control with request generators, grant arbiters and acceptance arbiters 122. Line cards with unicast and multicast high and low priority queues and packet indication generators 121 send packet traffic indications 123 to control with request generators, grant arbiters and acceptance arbiters 122. Returned are accepted/scheduled indications 124 of packets to line cards 121, which initiate the sending of the accepted packets at the scheduled time. Additionally, control with request generators, grant arbiters and acceptance arbiters 122 sends configuration information 125 to switch 120, so the switching fabric can be configured to communicate the accepted packets between the switch input and output ports and connected line cards 121.

Figure 1D:
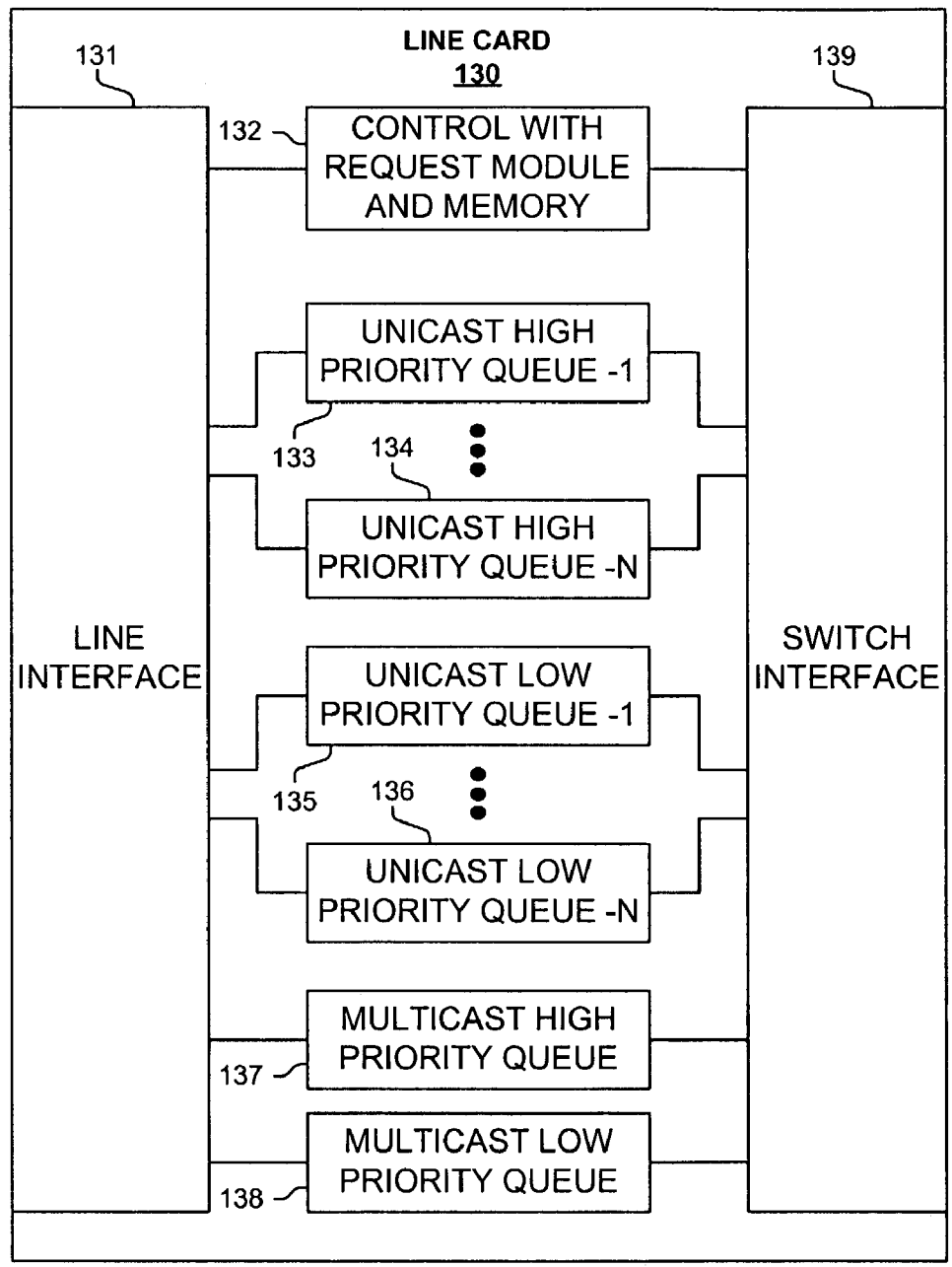

FIG. 1D illustrates one embodiment of a line card 130. Signals including packets or other data formats are received and transmitted by line interface 131. Shown are N unicast high priority queues 133-134, N unicast low priority queues 135-136, one multicast high priority queue 137, and one multicast low priority queue 138, wherein incoming packets to be scheduled are placed. Typically, N corresponds to the number of output line cards or the number of switch output ports to which the line card can send packets. In one embodiment, additional or fewer queues are used, such as, but not limited to queues for buffering packets having additional priority levels. Control with request module and memory 132 sends packet indications and receives accepted and scheduled indications via switch interface 139.

Figure 1E:
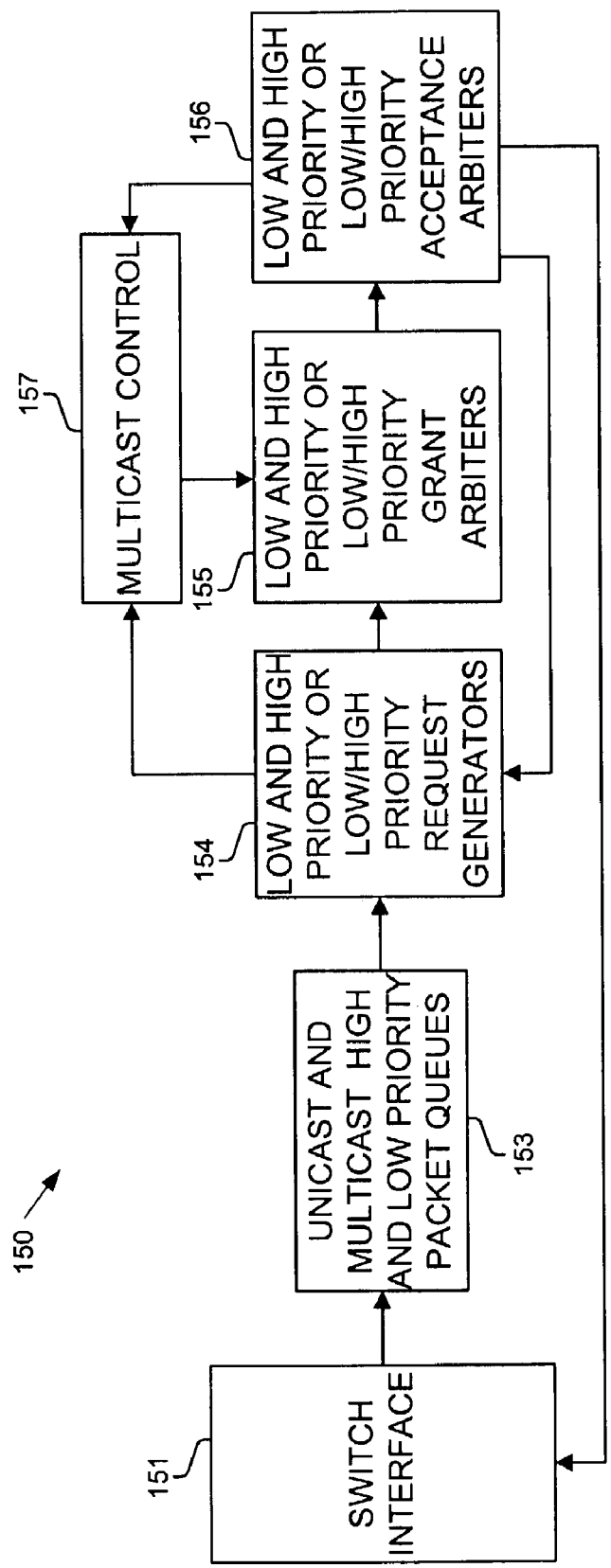

FIG. 1E illustrates a system 150 including low and high priority or a combination low/high priority request generators 154, low and high priority or a combination low/high priority grant arbiters 155, and low and high priority or a combination low/high priority acceptance arbiters 156. The terminology "low and high priority or a combination low/high priority" is used to emphasize the extensible nature of the invention and embodiments thereof.

Packet indications are received from various line cards via switch interface 151 and stored in the corresponding queue of the unicast and multicast high and low priority queues 153. Request generators 154, based on packet occupancy indications typically derived from packet counts stored in unicast and multicast high and low priority queues 153, generate unicast and multicast high and low priority requests and communicate these to corresponding ones of grant arbiters 155 based on the destination of the packets. Grant arbiters 155 in turn generate and communicate their grants to corresponding ones of the acceptance arbiters 156 based on the source of the granted requests. The acceptances are then, or after multiple iterations, communicated to switch interface 151 for relaying to the appropriate line cards and switch configuration control. In one embodiment, a multicast control 157 is used maintain a common multicast position used by grant arbiters 155 in selecting which multicast requests to grant.

Figure 2:
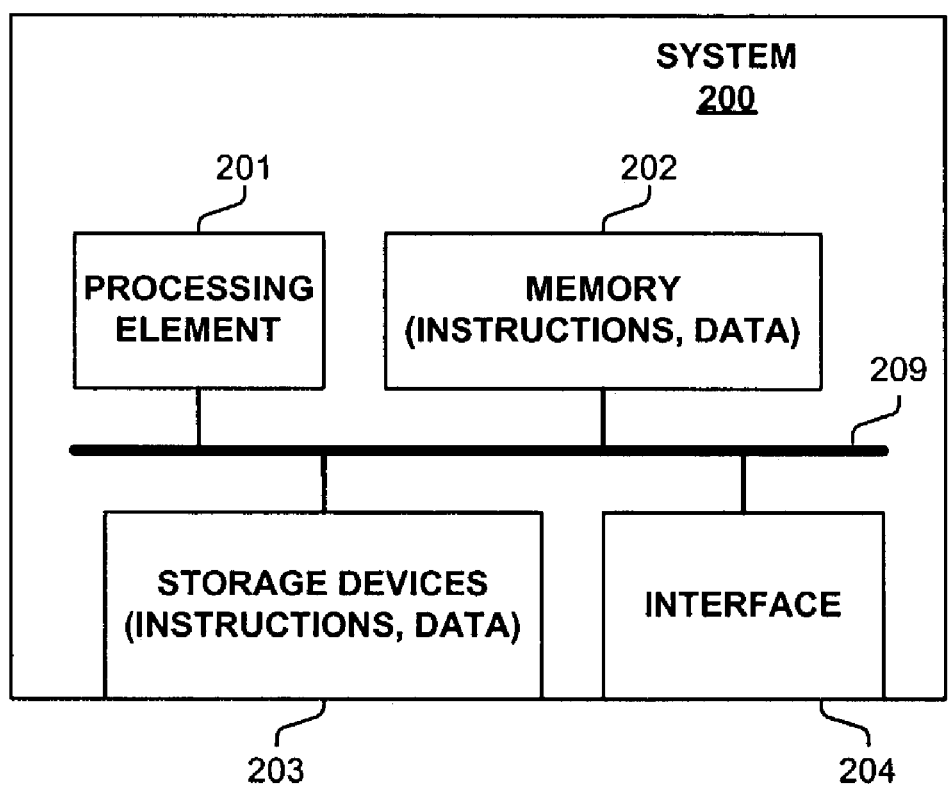

FIG. 2 illustrates one embodiment of a system 200, which may include, but is not limited to one or more request generators, grant arbiters and/or acceptance arbiters for scheduling packets according to the invention. In one embodiment, system 200 includes a processing element 201, memory 202, storage devices 203, and switch/control interface 204, which are typically coupled via one or more communications mechanisms 209 (shown as a bus for illustrative purposes.) Various embodiments of system 200 may include more or less elements. The operation of system 200 is typically controlled by processing element 201 using memory 202 and storage devices 203 to perform one or more scheduling tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with the invention. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with the invention.

Figure 3:
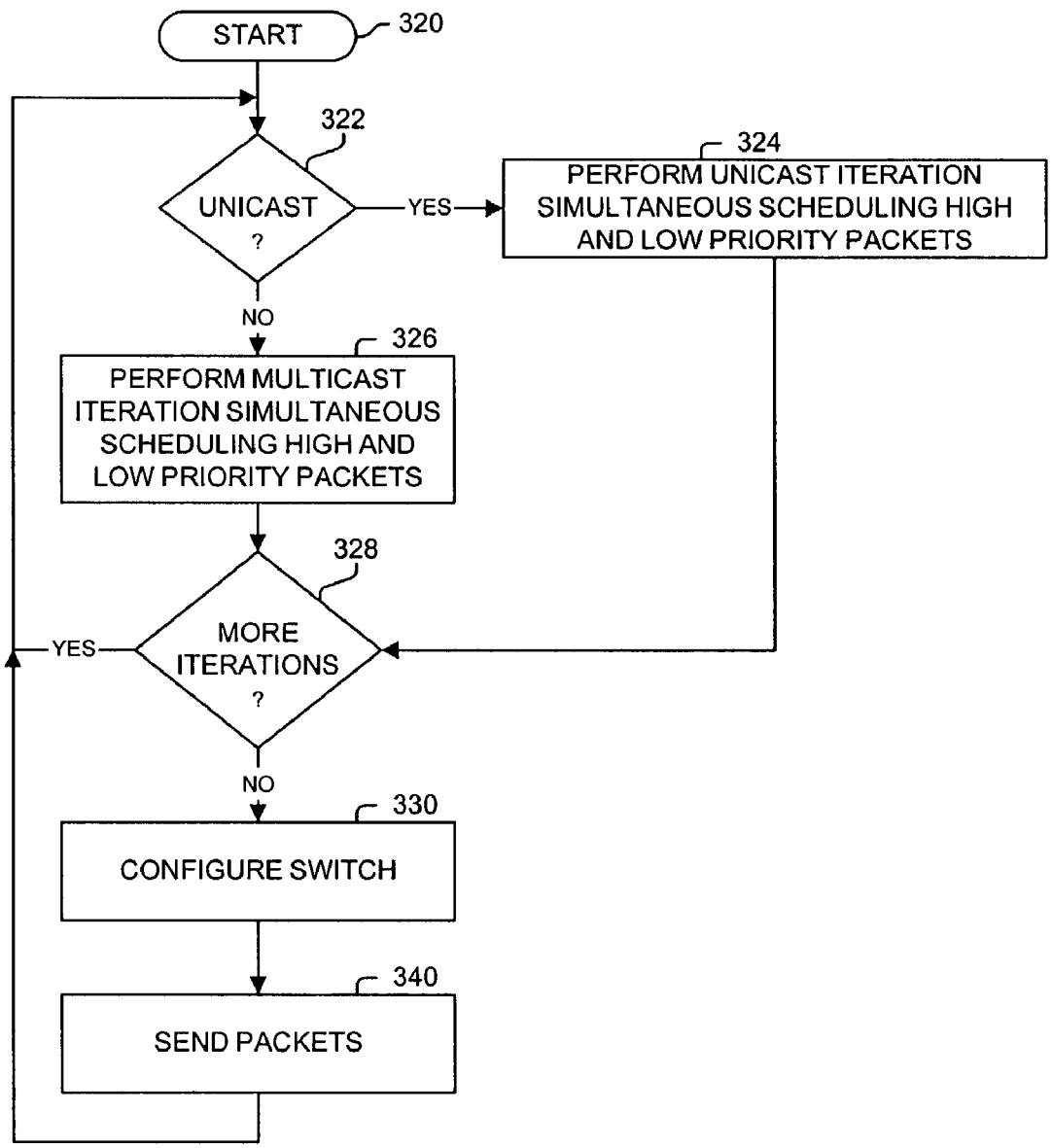
FIG. 3 is a flow diagram of a process used in one embodiment for simultaneously scheduling multiple priorities of packets in one or more iterations.

FIG. 3 illustrates a process used in one embodiment for scheduling packets using one or more scheduling iterations, including unicast and/or multicast iterations simultaneously scheduling multiple priorities of packets in any desired order. Processing begins with process block 320. As determined in process block 322, if a unicast iteration is next, then in process block 324, the unicast scheduling iteration is performed which simultaneously schedules high and low priority unicast packets; otherwise, a multicast scheduling iteration is performed in process block 326 which simultaneously schedules high and low priority multicast packets. As determined in process block 328, if there are more scheduling iterations to be performed for this scheduling cycle, then processing returns to process block 322 to perform the next scheduling iteration. Otherwise, the switch is configured in process block 330, packets are sent in process block 340, and processing then returns to process block 322.

Figure 4A:
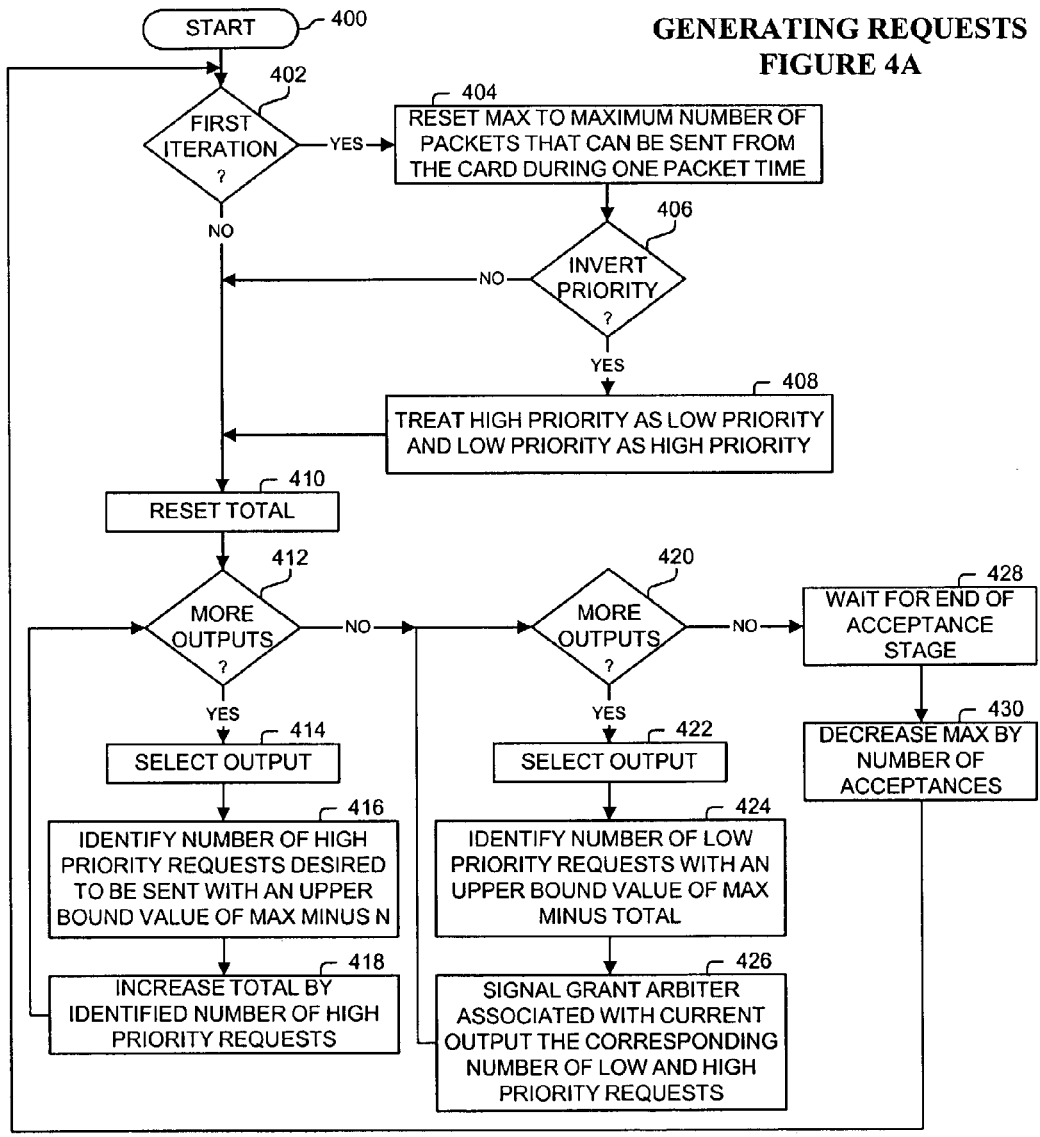
FIG. 4A is a flow diagram of a process used in one embodiment for generating requests.

FIG. 4A illustrates a process used in one embodiment for simultaneously generating requests corresponding to high and low priority packets. Processing begins with process block 400, and proceeds to process block 402. As determined in process block 402, if this is a first iteration of the scheduling process, then in process block 404, the variable MAX is reset to the maximum number of packets that can be sent from the card during one packet time. Note, MAX will be decreased by the number of acceptances so future iterations will operate to fill only the available bandwidth. Next, as determined in process block 406, if priority should be inverted, then in process block 408, indications are set such that the semantics of the priority of the packets are reversed so that low priority packets correspond to high priority requests, grants and acceptances, and high priority packets correspond to low priority requests, grants and acceptances during this scheduling cycle. This optional feature provides a mechanism for reducing a potential starvation of the sending of low priority packets, and typically would only be used a small percentage of the time (e.g., five percent or some other value).

Next, in process block 410, the TOTAL number of requests is reset to zero. While there are more outputs to process as determined in process block 412, an output is selected in process block 414. Next, in process block 416, the number of high priority requests (corresponding to high priority packets desired to be sent) is determined with an upper bound of the current value of MAX minus N. In one embodiment, the value of N is zero, and thus, the upper bound is just the current value of MAX. In one embodiment, the value of N may vary among scheduling iterations and/or scheduling cycles. One embodiment maintains the total number of high priority requests and uses additional logic during processing to effectively enforce this cap of MAX minus N requests. Next, in process block 418, the variable TOTAL is increased by the number of identified high priority requests, and processing returns to process block 412.

After all outputs have been processed once for determining the high-priority requests, processing proceeds to process block 420 to determine the low priority requests. While there are more outputs to process as determined in process block 420, an output is selected in process block 422. Next, in process block 424, the number of low priority requests (corresponding to low priority packets desired to be sent) is determined with an upper bound of the current value of MAX minus TOTAL. In one embodiment, the value of N is zero, and thus, the upper bound is just the current value of MAX minus TOTAL. One embodiment maintains the total number of low priority requests and uses additional logic during processing to effectively enforce this cap of MAX minus TOTAL. By using TOTAL, the sum of all high priority requests across all outputs, one embodiment guarantees that a low priority request will not be accepted and use bandwidth that could have been allocated to a high priority packet in a subsequent scheduling iteration, such as in the second or third iteration.

Next, in process block 426, the grant arbiter corresponding to the current output is signaled with indications of the corresponding number of high and low priority requests. In one embodiment, the requests are determined for all outputs before sending requests to any of the arbiters. Processing returns to process block 420.

After all outputs have been processed, processing proceeds to process block 428, wherein the request generator waits for the end of the acceptance stage wherein it is notified of its accepted requests. In process block 430, MAX is decreased by this number of acceptances, and processing returns to process block 402. In one embodiment, MAX is only decreased by the number of high priority acceptances, as the number of low priority requests is already limited by the total number of high priority requests.

FIG. 4B illustrates a process used in one embodiment for simultaneously generating requests corresponding to high and low priority packets. Processing begins with process block 450, and proceeds to process block 452. As determined in process block 452, if this is a first iteration of the scheduling process, then in process block 454, the variable MAX is reset to the maximum number of packets that can be sent from the card during one packet time. Note, MAX will be decreased by the number of acceptances so future iterations will operate to fill only the available bandwidth. Next, as determined in process block 456, if priority should be inverted, then in process block 458, indications are set such that the semantics of the priority of the packets are reversed so that low priority packets correspond to high priority requests, grants and acceptances, and high priority packets correspond to low priority requests, grants and acceptances during this scheduling cycle. This optional feature provides a mechanism for reducing a potential starvation of the sending of low priority packets, and typically would only be used a small percentage of the time (e.g., five percent or some other value).

While there are more outputs to process as determined in process block 460, an output is selected in process block 462. Next, in process block 464, the number of high priority requests (corresponding to high priority packets desired to be sent) is determined with an upper bound of the current value of MAX minus N. In one embodiment, the value of N is zero, and thus, the upper bound is just the current value of MAX. In one embodiment, the value of N may vary among scheduling iterations and/or scheduling cycles. One embodiment maintains the total number of high priority requests and uses additional logic during processing to effectively enforce this cap of MAX minus N requests. Next, in process block 468, the number of low priority requests (corresponding to low priority packets desired to be sent) is determined with an upper bound of the current value of MAX minus the number of high priority requests. In one embodiment, the value of N is zero, and thus, the upper bound is just the current value of MAX minus the number of high priority requests. One embodiment maintains the total number of low priority requests and uses additional logic during processing to effectively enforce this cap of MAX minus the number of high priority requests. By using the number of high priority requests of the current output, the one embodiment allows a low priority request to be accepted which may use bandwidth that could have been allocated to a high priority packet in a subsequent scheduling iteration, such as in the second or third iteration.

Then, in process block 470, the grant arbiter corresponding to the current output is signaled with indications of the corresponding number of high and low priority requests. In one embodiment, the requests are determined for all outputs before sending requests to any of the arbiters. Processing returns to process block 460.

After all outputs have been processed, processing proceeds to process block 472, wherein the request generator waits for the end of the acceptance stage wherein it is notified of its accepted requests. In process block 474, MAX is decreased by this number of acceptances, and processing returns to process block 452.

FIG. 5 illustrates a process used in one embodiment for generating grants based on received requests. Processing begins with process block 500, and proceeds to process block 502, wherein the high and low priority grant starting positions are initialized (i.e., when a SLIP methodology or variant thereof is optionally used). Next, in process block 504, indications of the generated requests (e.g., those generated in a process such as that illustrated in FIG. 4A or FIG. 4B) are received. As determined in process block 506, if this is a first iteration, then in process block 508, the variable MAX is reset to the maximum number of packets that can be received by the corresponding card during one packet time. Note, MAX will be decreased by the number of acceptances so future iterations will operate to fill only the available bandwidth.

Next, in process block 510, the number of high priority grants to send is identified. In one embodiment, this corresponds to the minimum of the number of received requests and the current value of MAX minus N. In one embodiment, the value of N is zero, and thus, the upper bound is just the current value of MAX minus N. In process block 512, the number of low priority grants to send is identified. In one embodiment, this corresponds to the maximum of zero and MAX minus the number of high priority grants identified in process block 510. In one embodiment, the value of N is zero, and thus, this corresponds to the maximum of zero and MAX minus the number of high priority grants identified in process block 510. Next, in process block 514, the high and low priority grants are signaled to the corresponding acceptance arbitrators. These grants are determined based on the number of grants to allow and the value of the grants' starting position, as well as any generated grants previously generated during an earlier iteration of this scheduling cycle. Next, in process block 516, indications of the accepted grants are received, and the value of MAX is decreased accordingly. As determined in process block 518, if all the scheduling iterations have not been performed, then processing returns to process block 504.

Otherwise, processing proceeds to process block 520, wherein the high priority grant starting position is advanced if a request at the high priority grant starting position was accepted during the first iteration. Then, in process block 522, the low priority grant starting position is advanced if a request at the low priority grant starting position was accepted during the first iteration or if a request at the low priority grant starting position was accepted during a subsequent iteration when it was not available during any previous iteration (i.e., no bandwidth was allocated to low priority packets during the first scheduling iteration as it was reserved for high priority packets.) Processing then returns to process block 504. In one embodiment, MAX is only decreased by the number of high priority accepted grants, as the number of low priority grants is already limited by the total number of high priority grants.

Figure 6:
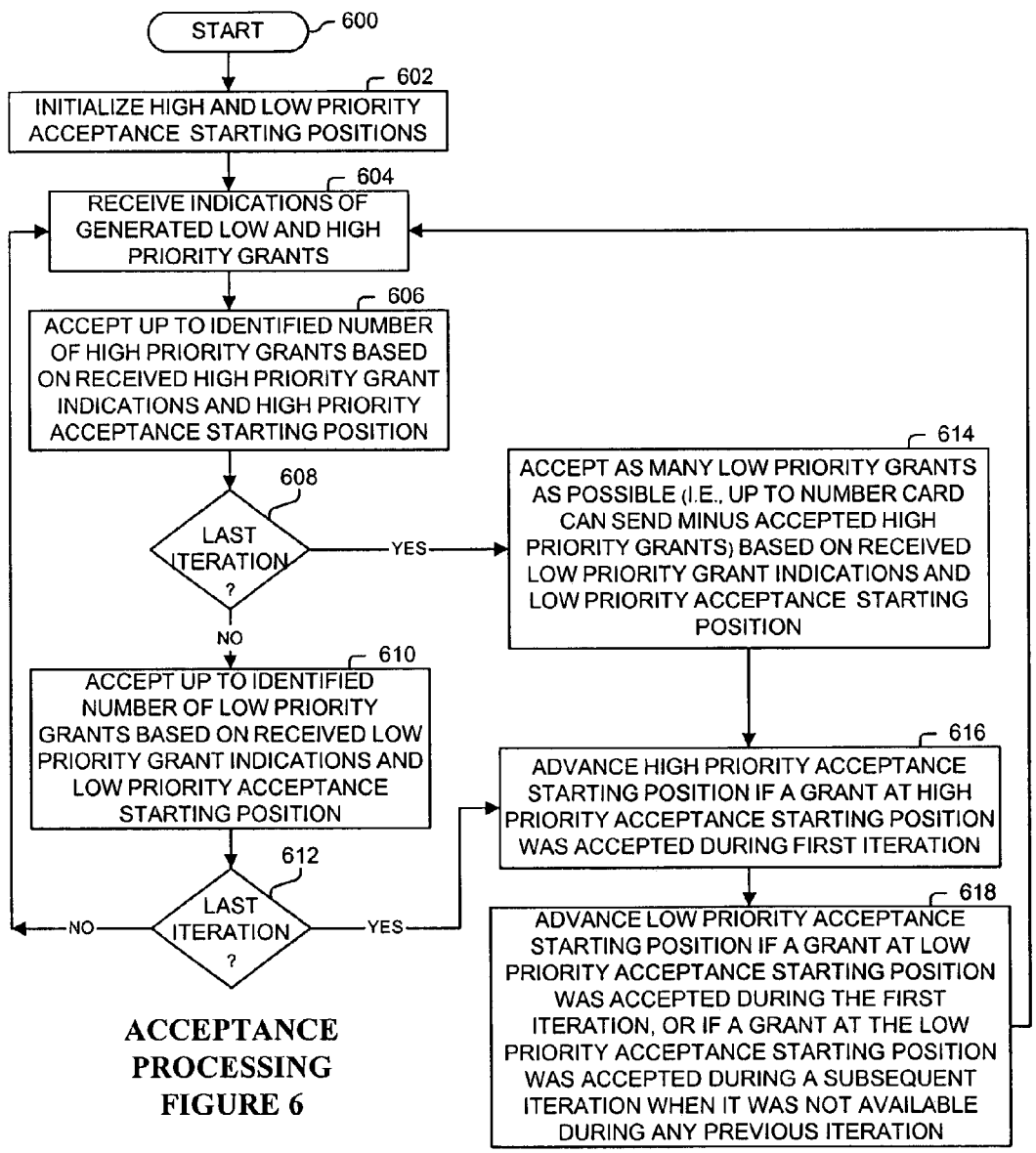
FIG. 6 is a flow diagram of a process used in one embodiment for performing acceptance processing.

FIG. 6 illustrates a process used in one embodiment for generating acceptances based on received grants. Processing begins with process block 600, and proceeds to process block 602, wherein the high and low priority acceptance starting positions are initialized (i.e., when a SLIP methodology or variant thereof is optionally used). Next, in process block 604, indications of the generated grants (e.g., those generated in a process such as that illustrated in FIG. 5) are received. Next, in process block 606, up to the number of previously identified high priority requests (i.e., the value of MAX as in FIG. 4A or FIG. 4B) are accepted based on the received high priority grants and the high priority acceptance starting position. As determined in process block 608, if this is the last iteration, then processing optionally proceeds to process block 614, wherein as many low priority grants are accepted as possible to fill any remaining bandwidth as there will be no more scheduling rounds. Otherwise, in process block 610, up to the number of previously identified low priority grants (i.e., the value of MAX minus TOTAL as in FIG. 4A) are accepted based on the received low priority grants and the low priority acceptance starting position. As determined in process block 612, if this is the last iteration, then processing proceeds to process block 616, wherein the high priority acceptance starting position is advanced if a grant at the high priority acceptance starting position was accepted during the first iteration. Then, in process block 618, the low priority acceptance starting position is advanced if a grant at the low priority acceptance starting position was accepted during the first iteration or if a grant at the low priority acceptance starting position was accepted during a subsequent iteration when it was not available during any previous iteration (i.e., no bandwidth was allocated to low priority packets during the first scheduling iteration as it was reserved for high priority packets.) Processing then returns to process block 604.

Figure 7:
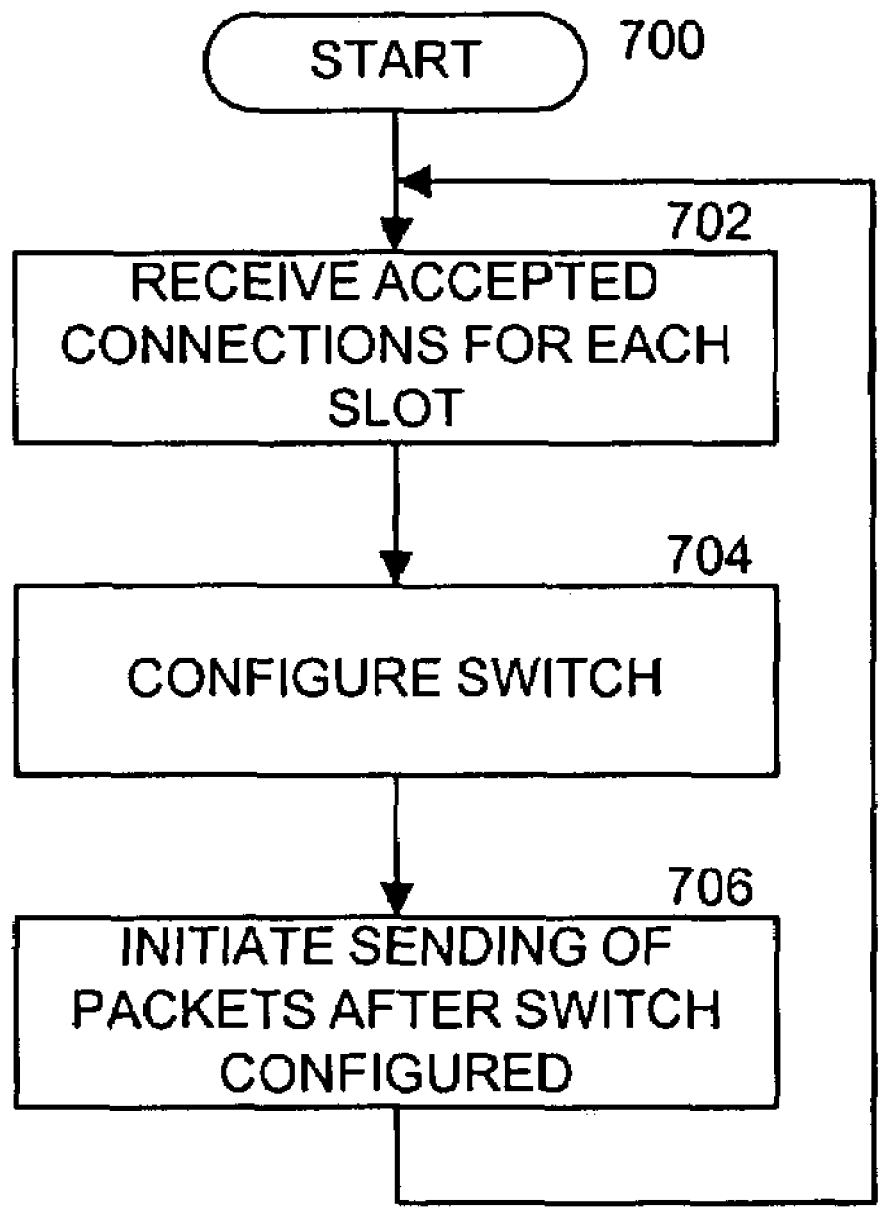
FIG. 7 is a block diagram used in one embodiment for configuring the switch and initiating the sending of packets across the switch.

FIG. 7 illustrates a process used in one embodiment for configuring a switch (e.g., non-blocking switch fabric) and sending of the accepted packets. Processing begins with process block 700, and proceeds to process block 702, wherein indications of the accepted connection are received. In process block 704, the switch is configured at the appropriate time to connect the appropriate input and output ports of the switch corresponding to the accepted requests. Then, in process block 706, sending of the packets are initiated and sent. Processing returns to process block 702.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for scheduling, the method comprising:
   identifying a maximum number of requests that can be sent from a particular input; and
   for each iteration of one or more iterations of a scheduling process performing each of steps (1), (2), and (3):
   (1) identifying a number of high priority requests corresponding to a first priority of packets desired to be sent from the particular input to a particular output, wherein the number of high priority requests is less than or equal to the maximum number of requests;
   (2) identifying a number of low priority requests corresponding to a second priority of packets desired to be sent from the particular input to the particular output, wherein the number of low priority requests is less than or equal to the maximum number of requests minus the number of high priority requests; and (3) signaling a grant arbiter associated with the particular output both: (a) the number of high priority requests and (b) the number of low priority requests.

2. The method of claim 1, wherein the maximum number of requests equals the maximum number of packets that can be sent from the particular input in a single packet time.

3. The method of claim 1, further comprising receiving one or more indications of a number of acceptances of previously generated requests; and in response, performing another iteration of said one or more iterations with the maximum number of requests being equal to the maximum number of packets that can be sent from the particular input in a single packet time decreased by the number of acceptances of previously generated requests.

4. The method of claim 1, wherein the first priority of packets is higher than the second priority of packets.

5. The method of claim 1, wherein the second priority of packets is higher than the first priority of packets.

6. An apparatus for scheduling, the apparatus comprising:
means for identifying a maximum number of requests that can be sent from a particular input;
means for identifying a number of high priority requests corresponding to a first priority of packets desired to be sent from the particular input to a particular output, wherein the number of high priority requests is less than or equal to the maximum number of requests;
means for identifying a number of low priority requests corresponding to a second priority of packets desired to be sent from the particular input to the particular output, wherein the number of low priority requests is less than or equal to the maximum number of requests minus the number of high priority requests; and
means for signaling, during each iteration of one or more iterations of a scheduling process, a grant arbiter associated with the particular output both the number of high priority requests and the number of low priority requests.

7. The apparatus of claim 6, wherein the maximum number of requests equals the maximum number of packets that can be sent from the particular input in a single packet time.

8. The apparatus of claim 6, further comprising means for receiving one or more indications of a number of acceptances of previously generated requests;
wherein another scheduling iteration of said one or more iterations is performed with the maximum number of requests being equal to the maximum number of packets that can be sent from the particular input in a single packet time decreased by the number of acceptances of previously generated requests.

9. An apparatus for scheduling, the apparatus comprising:
a plurality of request generators;
a plurality of grant arbiters coupled to the plurality of request generators;
a plurality of acceptance arbiters coupled to the plurality of grant arbiters;
wherein each of the plurality of request generators is configured for generating high priority requests and low priority requests for its associated input of a plurality of inputs;
wherein each of the plurality of grant arbiters is configured for generating high priority grants based on received high priority requests and low priority grants based on received low priority requests; and
wherein each of the plurality of acceptance arbiters is configured for generating high priority acceptances based on received high priority grants and low priority acceptances based on received low priority grants, said high and low priority acceptances corresponding to its said associated input;
wherein said generating said high and low priority requests includes:
identifying a maximum number of requests that can be sent from its said associated input and a maximum number of high priority requests, wherein the maximum number of high priority requests is the maximum number of requests minus N;
identifying for each particular output of a plurality of outputs a number of high priority requests corresponding to a first priority of packets desired to be sent from its said associated input to said particular output, wherein the number of high priority requests is less than or equal to the maximum number of high priority requests;
identifying a number of total high priority requests wherein the number of total high priority requests is the lesser of the maximum number of high priority requests and the sum of the number of high priority requests for the plurality of outputs;
identifying for each particular output of the plurality of outputs, a number of low priority requests corresponding to a second priority of packets desired to be sent from the particular input to said particular output, wherein the number of low priority requests is less than or equal to the maximum number of requests minus the number of total high priority requests; and
signaling each grant arbiter of a plurality of grant arbiters a corresponding indication of the number of high priority requests and the number of low priority requests for said each particular output to which said each grant arbiter is associated;
wherein said generating high and low priority grants includes:
identifying a total number of high priority grants to generate;
identifying a total number of low priority grants to generate;
determining which first set of acceptance arbiters to allocate the total number of high priority grants to generate;
determining which second set of acceptance arbiters to allocate the total number of low priority grants to generate; and
signaling each of the first set of acceptance arbiters an indication of a corresponding number of the total number of high priority grants to generate; and
signaling each of the second set of acceptance arbiters an indication of a corresponding number of the total number of low priority grants to generate.

10. An apparatus for scheduling, the apparatus comprising:
a plurality of request generators corresponding to a plurality of inputs;
a plurality of grant arbiters, coupled to the plurality of request generators, corresponding to a plurality of outputs;
a plurality of acceptance arbiters, coupled to the plurality of grant arbiters, corresponding to the plurality of inputs;
wherein each of the plurality of request generators is configured to determine in a same scheduling iteration of one or more scheduling iterations both a number of high priority requests and a number of low priority requests for each of the plurality of outputs, and for communicating corresponding both of the number of high priority requests and the number of low priority request to each of the plurality of request generations;

wherein each of the plurality of grant arbiters is configured for generating high priority grants based on received high priority requests and low priority grants based on received low priority requests; and wherein each of the plurality of acceptance arbiters is configured for generating high priority acceptances based on received high priority grants and low priority acceptances based on received low priority grants, said high and low priority acceptances corresponding to its said associated input.

11. The apparatus of claim 10, wherein each of the plurality of request generators is configured to selectively invert priorities by selectively corresponding (a) higher priority packets with high priority requests and lower priority packets with low priority requests, or (b) higher priority packets with low priority requests and lower priority packets with high priority requests.

* * * * *